United States Patent [19]
Swenson

[11] Patent Number: 5,919,494
[45] Date of Patent: Jul. 6, 1999

[54] ERGONOMIC MOLD MANIPULATOR

[75] Inventor: Harold W. Swenson, Dover, N.H.

[73] Assignee: Textron Automotive Company Inc., Troy, Mich.

[21] Appl. No.: 08/864,767

[22] Filed: May 28, 1997

[51] Int. Cl.[6] .................. B29C 33/20; B29C 44/12
[52] U.S. Cl. .................. 425/195; 264/39; 425/117; 425/450.1; 425/453; 425/454
[58] Field of Search .................. 425/117, 125, 425/127, 182, 195, 450.1, 453, 454; 264/39

[56] References Cited

U.S. PATENT DOCUMENTS

| | | | |
|---|---|---|---|
| Re. 30,130 | 10/1979 | Edwards | 425/453 |
| 2,370,294 | 2/1945 | Dodge . | |
| 2,812,543 | 11/1957 | Stacy . | |
| 3,142,093 | 7/1964 | Tribbett . | |
| 3,720,492 | 3/1973 | Hehl | 425/107 |
| 3,981,671 | 9/1976 | Edwards | 425/453 |
| 4,191,523 | 3/1980 | Niederst et al. | 425/589 |
| 4,269,587 | 5/1981 | Tranter | 425/451.9 |
| 4,337,026 | 6/1982 | Taubenmann et al. | 425/454 |
| 4,504,208 | 3/1985 | Kurumaji et al. | 425/589 |
| 4,708,625 | 11/1987 | Arend | 425/589 |
| 4,726,754 | 2/1988 | Breuker et al. | 425/406 |
| 5,044,919 | 9/1991 | Hama et al. | 425/453 |
| 5,052,908 | 10/1991 | Inaba et al. | 425/150 |
| 5,282,732 | 2/1994 | Eggert | 425/153 |

*Primary Examiner*—James P. Mackey
*Attorney, Agent, or Firm*—Reising, Ethington, Barnes, Kisselle, Learman & McCulloch PC

[57] ABSTRACT

A mold press includes an upper mold carrier mounted to slide up and down along an upright mold press frame and to rotate about a horizontal rotation axis. The mold press frame is supported on a mold press base to tip forward and aft about a horizontal upper mold pivot axis disposed parallel to and below the rotation axis. A lower mold carrier is supported on the mold press base below the upper mold carrier and above the upper mold pivot axis. The lower mold carrier includes a lower mold mounting plate that is pivotally supported on the mold press base for tipping motion along a hinged edge about a lower mold pivot axis that lies parallel to and below the rotation axis and above the upper mold pivot axis. An electronic motion controller may be programmed to coordinate the reciprocating, tipping and rotating motions to accommodate a variety of mold/retainer configurations. The motion controller may also be programmed to move the upper mold carrier and an attached upper mold portion into ergonomically optimum positions that meet different operators' needs.

17 Claims, 7 Drawing Sheets

ERGONOMIC MOLD MANIPULATOR

TECHNICAL FIELD

This invention relates generally to mold presses and, more particularly, to mold presses for carrying various forms of mold sections at different vertical height relationships with respect to a mold press frame while further providing drives and supports for positioning upper and lower mold carriers for ease of operator access for replacing mold sections and for removing molded products from mold sections mounted on the mold carriers.

BACKGROUND OF THE INVENTION

Various mold presses are known in which upper and lower mold carriers are vertically reciprocated during a mold process by hydraulic cylinders to apply, maintain and release clamping pressure on upper and lower mold sections that are attached to the upper and lower mold carriers, respectively. In such cases it is also known to include hydraulic drives for pivoting the mold carriers in so called booking presses to provide operators with access to the mold sections attached to the mold carriers. Operators require such access to remove finished molded products from the mold press, to insert parts, such as retainers and shells in the mold sections prior to injecting or pouring-in foam, and to periodically clean-out mold cavities of the mold sections.

A booking press of this type is disclosed in U.S. Pat. No. 5,282,732 issued Feb. 1, 1994 to Eggert. The Eggert patent discloses a mold press apparatus with an upper mold carrier supported on a mold press frame above a lower mold carrier supported on a mold press base. The upper mold carrier is supported for pivotal movement about a upper mold pivot axis that is displaced from the upper mold carrier. The upper mold carrier is also supported for reciprocal movement toward and away from the upper mold pivot axis. However, The Eggert mold press does not both rotate and pivotally tip the upper mold carrier.

What is needed is a mold press with an upper mold carrier that can be rotated and pivotally tipped into positions ergonomically suited to various operators and positions that accommodate a variety of mold/retainer configurations.

SUMMARY OF THE INVENTION

In accordance with this invention a mold press is provided that includes an upper mold tipper and an upper mold rotator that respectively tip and rotate the upper mold carrier into a wide range of positions to accommodate various operators and various mold/retainer configurations. The mold press includes an upper mold carrier supported on a mold press frame above a lower mold carrier supported on a mold press base. The upper mold carrier is supported for pivotal movement about a upper mold pivot axis displaced from the upper mold carrier and reciprocal movement toward and away from the upper mold pivot axis. The upper mold tipper pivotally supports the mold press frame and the upper mold carrier for pivotal tipping motion about the upper mold pivot axis. The upper mold pivot axis is disposed below the upper mold carrier. The upper mold rotator is connected between the mold press frame and the upper mold carrier and rotatably supports the upper mold carrier about a rotation axis generally parallel to the upper mold pivot axis.

According to one aspect of the invention each of two slide plate assemblies is mounted for reciprocal movement along one of two parallel lift tubes. The upper mold carrier is rotatably supported between the two slide plate assemblies.

According to another aspect of the invention one of two stabilizer plates is rotatably supported on each of the slide plate assemblies. In addition, one of two idler guides is rotatably supported on each of the two slide plate assemblies. Each stabilizer plate has an outer circumferential rim in guided turning engagement with one of the idler guides.

According to another aspect of the invention a rotator motor is operatively connected between one of the slide plate assemblies and the upper mold carrier. In addition, a rotator plate is rotatably and coaxially mounted with and fixed in relation to one of the stabilizer plates for rotation about the rotator axis. The rotator motor is a hydraulic motor supported on the first slide plate assembly and is in driving engagement with the outer circumferential rim of the rotator plate.

According to another aspect of the invention a chain is fixed along the outer circumferential rim of the rotator plate. The rotator motor is connected to a drive shaft that is fixed to a chain sprocket and the chain sprocket is in driving engagement with the outer circumferential chained rim of the rotator plate.

According to another aspect of the invention each of two upper mold lift cylinders is housed within one of the two lift tubes. A lower end of each upper mold lift cylinder is fixed within the lift tube it occupies and an upper end is supported for reciprocal movement within that lift tube. The upper mold lift cylinder upper ends each support one of the two slide plate assemblies.

According to another aspect of the invention at least one elongated rail is fixed to each lift tube. The slide plate assemblies are movably mounted for reciprocal motion along these elongated rails.

According to another aspect of the invention the upper mold tipper is movably supported on the mold press base for lateral positional adjustment relative to the base. This lateral position adjustment allows an operator to properly position the upper mold in relation to different longitudinal and angular lower mold positions on the lower mold carrier. The lateral position adjustment ability also allows an operator to adjust upper mold motion in relation to various lower mold configurations.

According to another aspect of the invention the base includes two tipper supports. The tipper supports are disposed at opposite ends of the base. Two frame supports are movably supported on the two tipper supports for horizontal position adjustment relative to the base. The frame supports pivotally connect to the tipper supports. The base may include floor attachments for securing the mold press to a flat surface such as a floor.

According to another aspect of the invention the upper mold tipper includes at least one tipper drive motor operatively connected between the mold press frame and one of the frame supports. The drive motor is a hydraulic motor that is supported on the first lift tube and is in driving engagement with an upper semi-circular rim of a tipper plate.

According to another aspect of the invention a chain is fixed along the upper semi-circular rim of the tipper plate and the tipper motor drive shaft is fixed to a chain sprocket. The chain sprocket is in driving engagement with the upper chained rim of the tipper plate.

According to another aspect of the invention the lower mold carrier is pivotally mounted to the base about a lower mold pivot axis that is generally parallel to the upper mold pivot axis. At least one lower mold carrier lift cylinder is connected at one end to the base and at a second end to the lower mold carrier.

According to one final aspect of the invention the mold press includes a multi-axis motion controller connected to the upper mold tipper, the lower mold tipper, the upper mold rotator and the lift cylinders.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
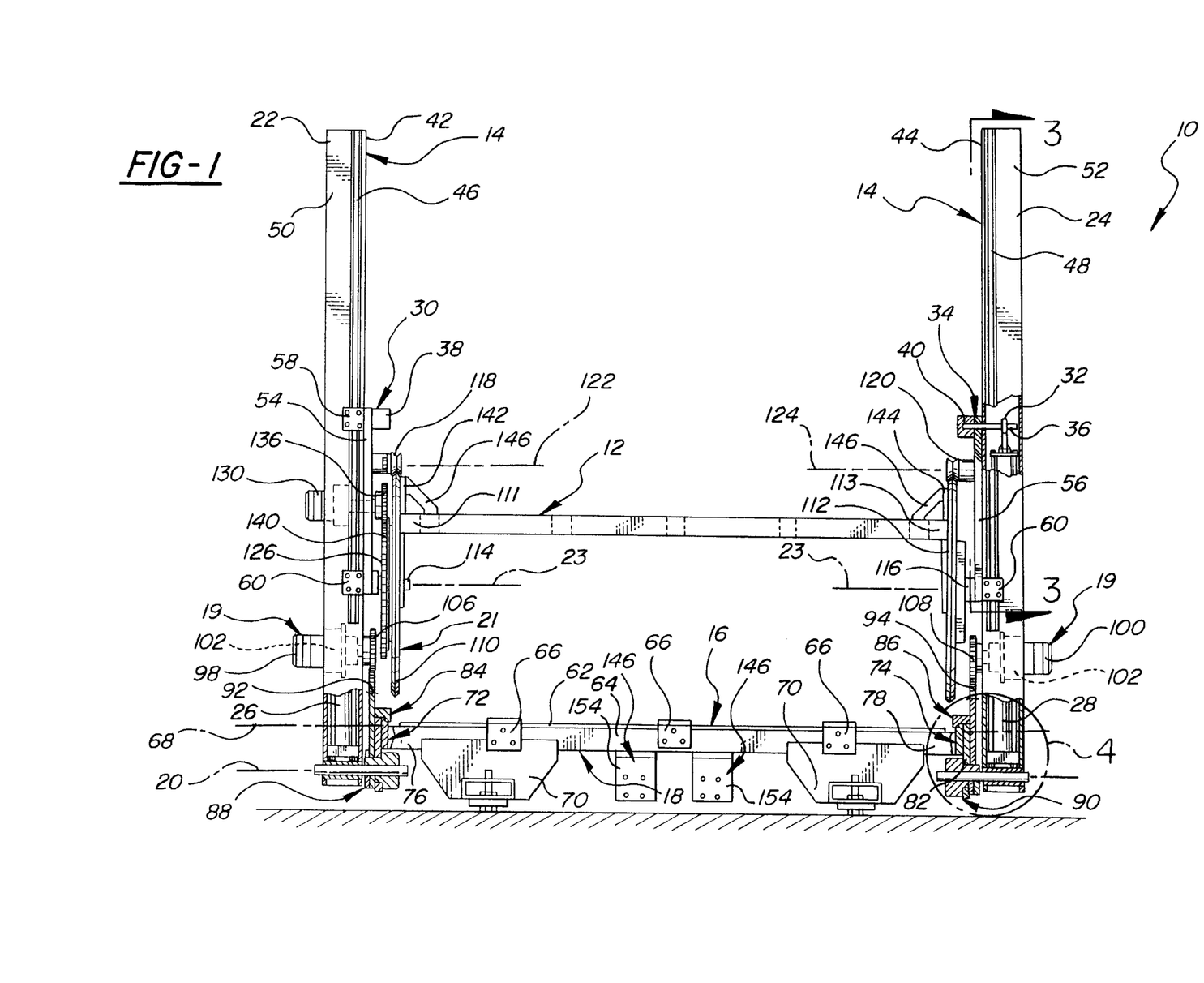
FIG. 1 is a partially cut-away front view of a mold press constructed according to the present invention.
Figure 2:
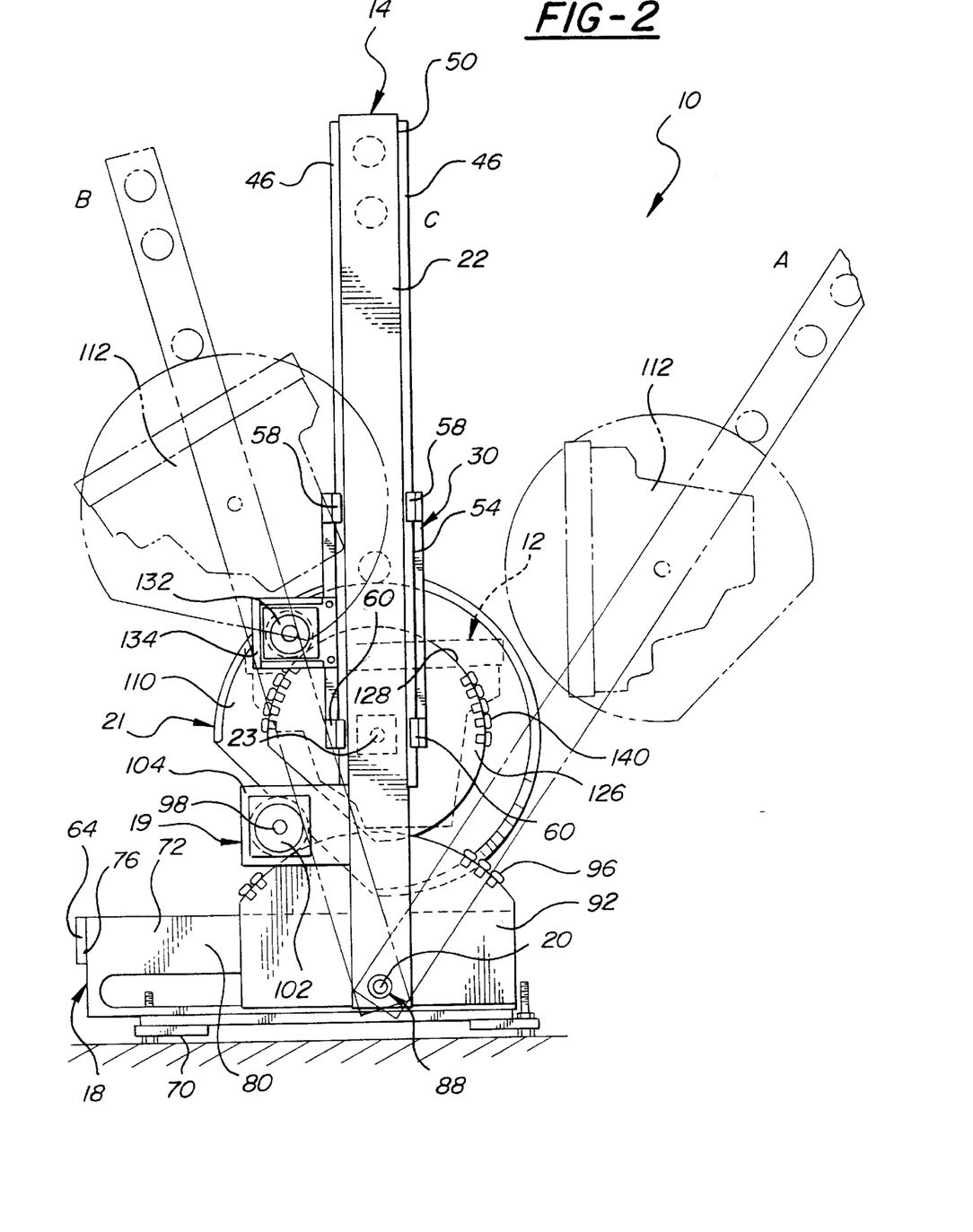
FIG. 2 is a left side view of the mold press of FIG. 1.

A mold press assembly constructed according to the present invention is generally shown at 10 in FIGS. 1 and 2. The mold press assembly 10 includes an upper mold carrier, generally indicated at 12 in FIGS. 1, 2, 6 and 7. A mold press frame 14, generally indicated at 14 in FIGS. 1, 2 and 5, supports the upper mold carrier 12 in a position above a lower mold carrier, shown at 16 in FIGS. 1, 8 and 9. A mold press base, generally indicated at 18 in FIGS. 1, 2, 8 and 9, supports the lower mold carrier 16 and an upper mold tipper generally indicated at 19 in FIGS. 1 and 2. The upper mold tipper 19 supports the upper mold carrier 12 and mold press frame 14 for pivotal "tipping" movement about a horizontal upper mold pivot axis, shown at 20 in FIGS. 1 and 2. The upper mold pivot axis 20 is displaced below the upper mold carrier 12. The upper mold carrier 12 is also supported for reciprocal movement toward and away from the upper mold pivot axis 20 along the mold press frame 14. An upper mold rotator 21 is connected between the mold press frame 14 and the upper mold carrier 12. The upper mold rotator 21 supports the upper mold carrier 12 on the mold press frame 14 while allowing the upper mold carrier 12 and an attached upper mold portion to rotate about a rotation axis 23. The rotation axis 23 is disposed parallel to the upper mold pivot axis 20 as shown in FIGS. 1 and 2.

An electronic motion controller (not shown) coordinates the reciprocating, tipping and rotating motions to ergonomically position the upper mold carrier 12 to meet different operators' needs and to enable the mold press assembly 10 to accommodate, a variety of mold/retainer configurations.

As is best shown in FIG. 1, the mold press frame 14 includes first 22 and second 24 parallel lift tubes made from square steel tubing. While square tubing is used in the illustrated embodiment, other shapes such as circular, hexagonal, triangular or topographical variants thereof would also work.

First 26 and second 28 upper mold lift cylinders are coaxially housed within the first 22 and second 24 lift tubes, respectively. Each of the upper mold lift cylinders 26, 28 is a Parker Series 2H hydraulic cylinder with a 3¼" bore and a 40 inch stroke.

Figure 3:
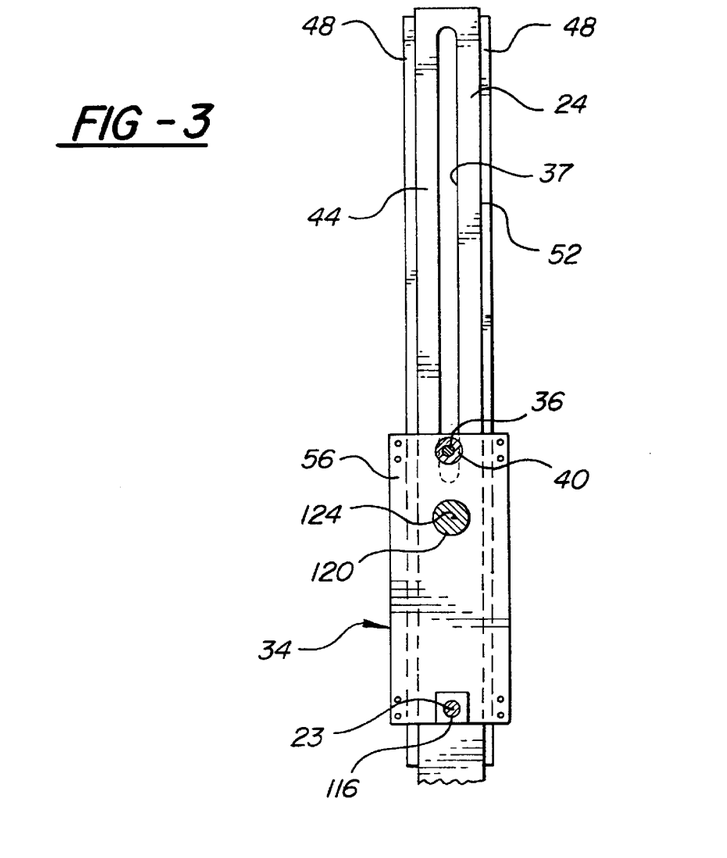
FIG. 3 is a cross-sectional view of the right end of the mold press of FIG. 1 taken along line 3—3.

As is representatively shown in FIG. 1, each of the upper mold lift cylinders 26, 28 has a lower end fixed within its respective lift tube 22, 24, and an upper end supported for reciprocal movement within the tube 22, 24. The upper end of each upper mold lift cylinder 26, 28 is connected to respective Parker #50945 female rod devises 32 that support respective first 30 and second 34 slide plate assemblies. A pair of rods 36 connect the two female rod devises 32 to their respective slide plate assemblies 30, 34. The rods 36 pass from the female rod devises 32, through longitudinally-oriented slots 37 in the walls of the lift tubes 22, 24, and into attachment hubs 38, 40 located at an upper end of each slide plate assembly 30, 34. As is best shown in FIG. 3, the slots 37 extend longitudinally along the approximate upper half of inner-facing side walls 42, 44 of the lift tubes 22, 24. As is representatively shown in FIG. 3, the lift tube slots 37 provide a path in which the rods 36 may move reciprocally with the motion of the upper mold lift cylinders 26, 28 and slide plate assemblies 30, 34.

As shown in FIGS. 1–3 and 5, a pair of elongated rails 46, 48 is fastened along a portion of the length of each lift tube 22, 24. One rail of each pair of rails 46, 48 is fastened to a front wall 50, 52 of each tube 22, 24 and the other rail of each pair of rails 46, 48 is fastened to a rear wall of each tube 22, 24 opposite the respective front wall 50, 52. The rails 46, 48 are made of carbon reinforced steel but may be made of any other suitable material.

Figure 5:
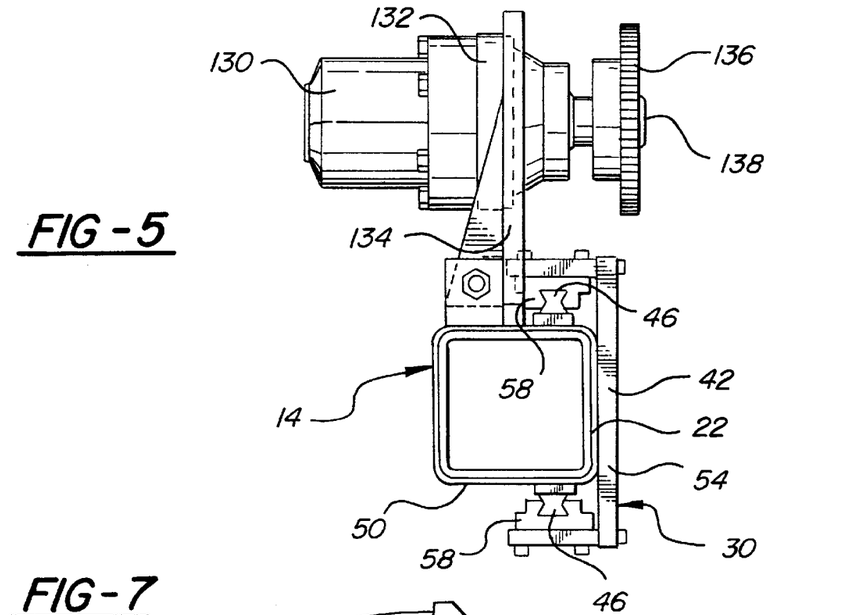
FIG. 5 is a partial top end view of the left end of the mold press of FIG. 1.

As is representatively shown in FIG. 3, each of the slide plate assemblies 30, 34 includes a vertically-oriented rectangular lift plate 54, 56 made from carbon steel plate. As best shown in FIG. 1, each slide plate assembly 30, 34 also includes an upper 58 and a lower 60 pair of linear motion guide brackets. The upper 58 and lower 60 pairs of brackets are attached to upper and lower corners of each lift plate 54, 56, respectively. Each pair of linear motion guide brackets 58, 60 slideably engages one of the pairs of elongated rails 46, 48 as shown in FIGS. 1, 2 and 5.

Figure 7:
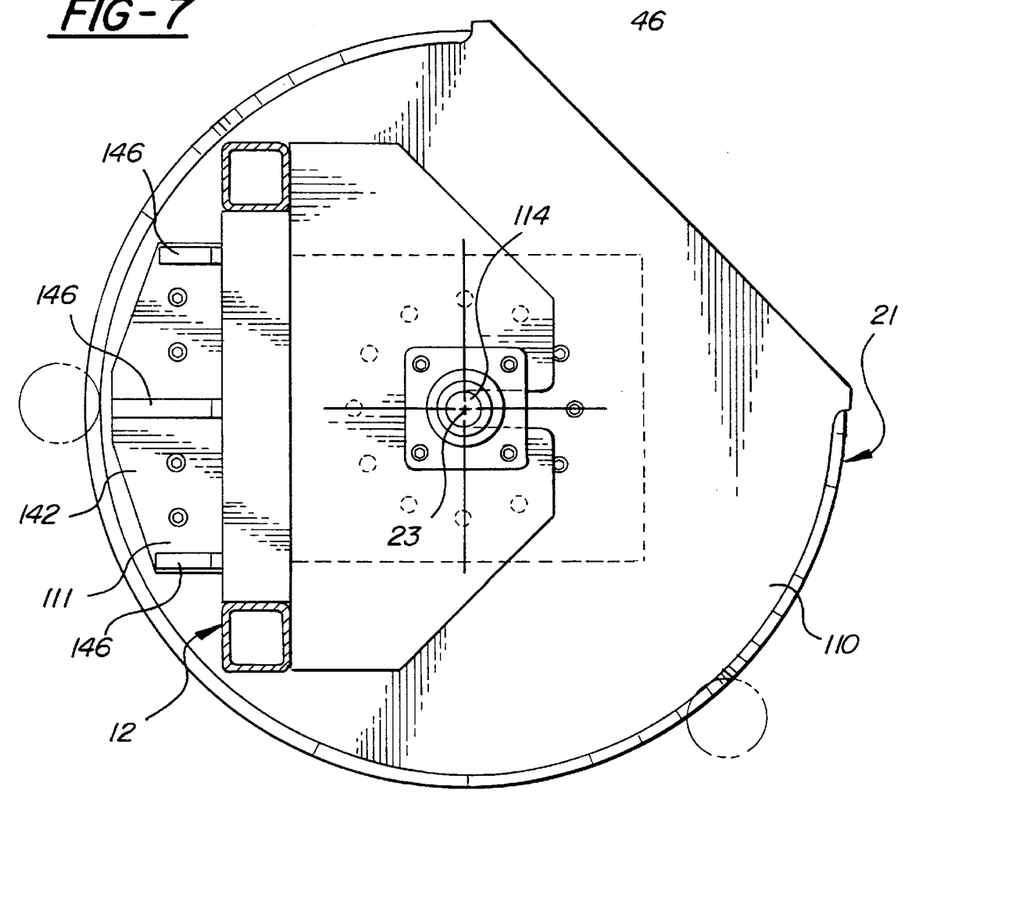
FIG. 7 is a cross-sectional end view of the upper mold carrier of FIG. 6 taken along line 7—7 of FIG. 6.
Figure 8:
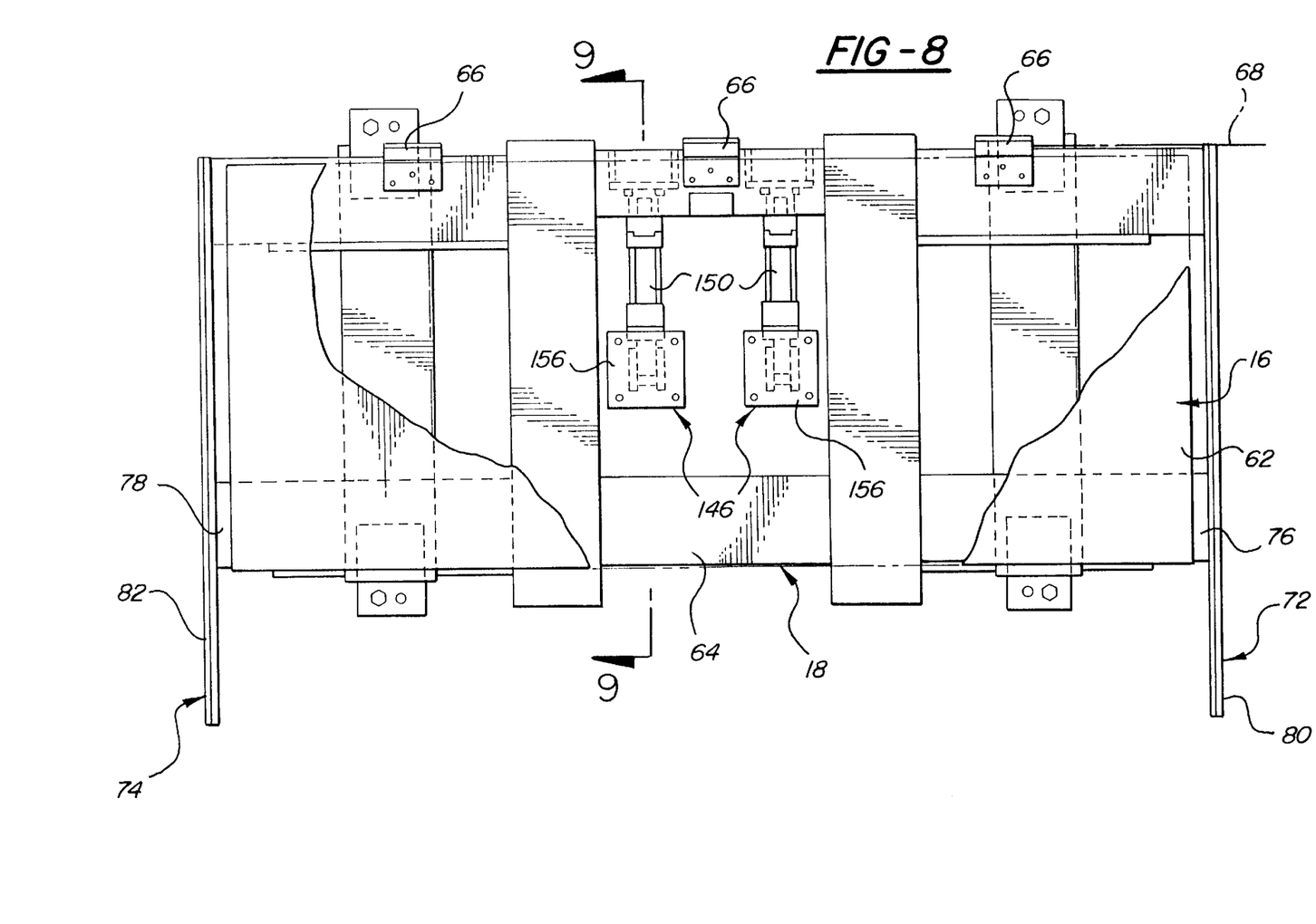
FIG. 8 is a partially cut-away plan view of a base frame portion of the mold press of FIG. 1.
Figure 9:
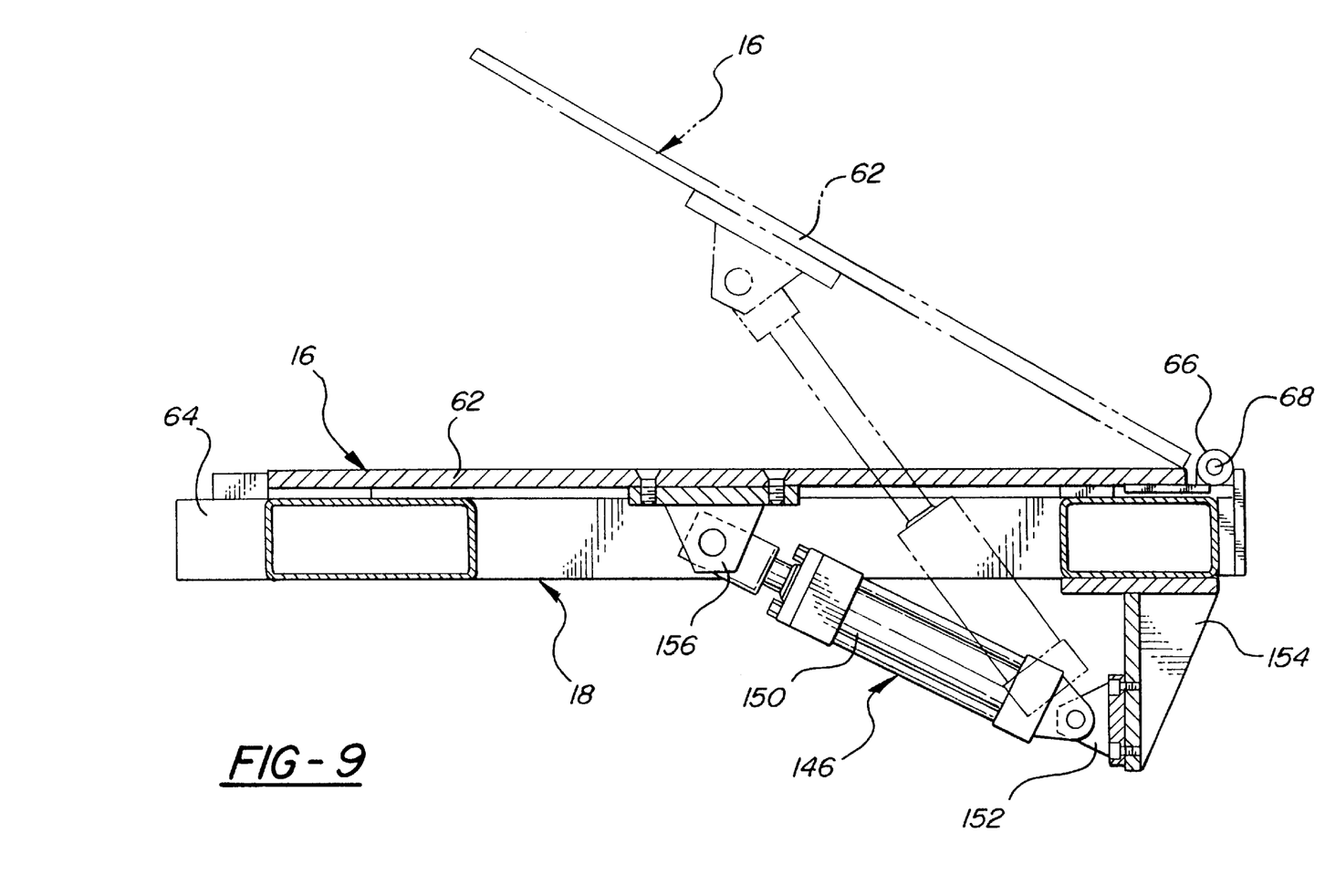
FIG. 9 is a cross-sectional side view of the base frame of FIG. 8 taken along line 9—9 of FIG. 8.

As is best shown in FIGS. 7 and 9, the lower mold carrier 16 includes a rectangular steel lower mold mounting plate 62 that lies flush on an upper surface of a base frame portion 64 of the mold press base 18. The lower mold mounting plate 62 is attached to the base frame 64 by three tool hinges 66 and includes provisions for attaching the lower portion of a mold. Mounting feet comprising pieces of angle iron (not shown) attach lower mold portions to the lower mold mounting plate 62. In other embodiments any suitable means of attaching the lower portion of a mold to a flat mounting plate may be employed. The hinges 66 allow the lower mold carrier steel mounting plate 62 to pivot about a lower mold pivot axis shown at 68 in FIGS. 1, 8 and 9. The lower mold pivot axis 68 is parallel to both the upper mold pivot axis 20 and the rotation axis 23.

The base frame portion 64 of the mold press base 18 comprises a rectangular framework of rectangular steel tubing. As shown in FIGS. 1 and 2, floor attachments 70 are bolted to a lower surface of the base frame 64 to fasten the mold press base 18 to a generally horizontal flat surface such as a floor.

Figure 4:
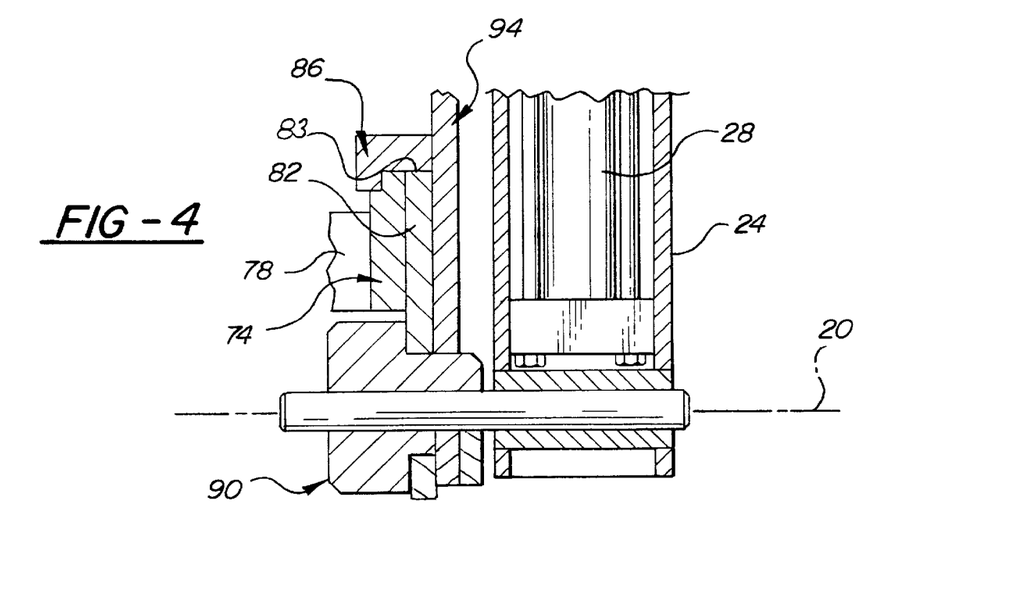
FIG. 4 is a magnified view of region 4 of the mold press of FIG. 1.

The mold press base 18 includes first and second tipper supports, generally indicated at 72 and 74 in FIGS. 1, 2 and 8. The tipper supports 72, 74 are disposed at respective first 76 and second 78 opposite ends of the base frame 64. As shown in FIGS. 1, 2 and 8, the tipper supports 72, 74 include respective first 80 and second 82 elongated rectangular carbon steel tipper-support plates. Each tipper-support plate 80, 82 is disposed horizontally and is bolted to the base frame 64 along the respective first 76 and second 78 ends of the base frame 64. An upper edge of each tipper-support 72, 74 is notched and chamfered to provide a sliding rail surface 83, as is best shown in FIG. 4, for slidably supporting the upper mold tipper 19, mold press frame 14, upper mold rotator 21 and upper mold carrier 12 for horizontal fore-aft movement.

The reason the upper mold tipper 19, mold press frame 14, upper mold rotator 21 and upper mold carrier 12 are slidably supported on the base frame 64 is to allow an operator to adjust the lateral position of the upper mold tipper 19 relative to the mold press base 18 and in a fore-aft direction perpendicular to the upper mold pivot axis 20.

As shown in FIG. 1, the upper mold tipper 19 comprises first 84 and second 86 frame supports that are movably supported on the respective first 72 and second 74 tipper supports in such a way as to allow the horizontal position of the frame supports 84, 86 to be adjusted relative to the mold press base 18. The first 84 and second 86 frame supports are pivotally connected to the first 72 and second 74 tipper supports, respectively, at the upper mold pivot axis 20. As is shown in FIGS. 1 and 2, at each pivot point along the upper mold pivot axis 20, the frame supports 84, 86 include respective first 88 and second 90 upper mold pivots, that is, pivot trunnion mount assemblies. The upper mold pivots, or, pivot trunnion mount assemblies 88, 90 pivotally support the mold press frame 14 and the upper mold carrier 12 for pivotal tipping motion about the upper mold pivot axis 20.

As shown in FIGS. 1 and 2, the first 84 and second 86 frame supports include respective first 92 and second 94 tipper plates, each of which has an upper semi-circular rim. The tipper plates 92, 94 are "chain plates"—each having a length of roller chain 96 fixed along its upper semi-circular rim.

The upper mold tipper 19 also includes first 98 and second 100 tipper motors operatively connected between the mold press frame 14 and the respective first 92 and second 94 tipper plates of the frame supports 84, 86. As shown by hidden lines in FIG. 1, each tipper motor 98, 100 is connected through a set of bearings to a single-reduction drive unit 102. The single-reduction drive units 102 are each mounted to a tipper motor bracket 104 which is bolted to the rear wall of one of the lift tubes 22, 24 as is representatively shown in FIG. 2. As shown in FIG. 1, each tipper motor 98, 100 drives a respective tipper chain sprocket 106, 108 through its respective single-reduction drive unit 102. Each tipper chain sprocket 106, 108 is fixed to a keyed outer end of a drive shaft that extends from each tipper motor single-reduction drive unit. Each tipper sprocket 106, 108 is in driving engagement with the length of roller chain 96 fixed along the outer circumferential rim of one of the tipper plates 92, 94.

Each tipper motor 98, 100 is a Parker #11A-129-AS-0 low-speed high-torque hydraulic motor. The single-reduction drive is a Power Wheel #6TB-13-04-K2⁻ drive with a 4.50:1 gear ratio. Each rotator sprocket 106, 108 is a Dodge #100B16 Type B 16-tooth sprocket bored to a 2.00" diameter. Each length of chain 96 is a length of #100 single strand roller chain.

The upper mold rotator 21 comprises the first 30 and second 34 slide plate assemblies which, as stated above, are slideably mounted for reciprocal movement along the respective first 22 and second 24 parallel lift tubes. As shown in FIGS. 1, 2, 6 and 7, first 110 and second 112 stabilizer plates, made from carbon steel plate, are rotatable mounted to the first 30 and second 34 slide plate assemblies, respectively. The stabilizer plates 110, 112 are rotatably supported in planes perpendicular to the rotation axis 23 on pivot mounts 114, 116 extending from the lift plates 54, 56 of the respective first 30 and second 34 slide plate assemblies. The stabilizer plates 110, 112 are bolted to first 111 and second 113 opposite ends of the upper mold carrier 12 to rotate with the upper mold carrier 12, and any attached upper mold portion, about the rotation axis 23.

As shown in FIG. 1, the upper mold rotator 21 also includes first 118 and second 120 idler guides rotatably supported on the lift plates 54, 56 of the respective first 30 and second 34 slide plate assemblies. Each idler guide 118, 120 includes an Osborne #VLRE-3 ½–4 V-grooved eccentric idler roller bolted to a carbon steel bracket. The steel brackets are bolted to the lift plates 54, 56.

As shown in FIG. 1, the idler guides 118, 120 are spaced from the rotation axis 23 with their V-grooved rollers supported in a position to rotate about respective idler axes 122, 124. The idler axes 122, 124 are disposed parallel to and above the rotation axis 23. The stabilizer plates 110, 112 have tapered outer circumferential rims th at matingly correspond to the roller V-grooves of the idler guides 118, 120. The stabilizer plates 110, 112 are mounted so that their tapered circumferential rims are in constant guided turning engagement with the respective V-grooves of the idler guides 118, 120 as is best shown in FIG. 1.

As shown in FIGS. 1 and 2, the upper mold rotator 21 includes a rotator plate 126 that is rotatably and coaxially mounted with and bolted to the first stabilizer plate 110. The rotator plate 126 rotates about the rotation axis 23 and has an outer semi-circular circumferential rim 128, best shown in FIG. 2, that lies at a constant radial distance from the rotation axis 23. The rotator plate 126 is made from carbon steel plates laminated together by welding.

As shown in FIGS. 1 and 5, the upper mold rotator 21 also includes a rotator motor 130 that is operatively connected between the first slide plate assembly 30 and the upper mold carrier 12. As is best shown in FIG. 5, the rotator motor 130 is connected through a set of bearings to a single-reduction drive unit 132. The single-reduction drive unit 132 is mounted to a rotator motor bracket 134 which is bolted to a forward edge of the lift plate portion 54 of the first slide plate assembly 30. The rotator motor 130 drives a rotator chain sprocket 136 through the single-reduction drive unit 132. The rotator chain sprocket 136 is fixed to a keyed outer end of a drive shaft 138 that extends from the rotator motor single-reduction drive unit 132. The rotator chain sprocket 136 is in driving engagement with a length of roller chain 140 fixed along the outer circumferential rim of the rotator plate 126.

The rotator motor 130 is a Parker #11A-054-AS-0 low-speed high-torque hydraulic motor. The single-reduction drive 132 is a Power Wheel #6TB-13-04-K2 drive with a 4.50:1 gear ratio. The rotator sprocket 136 is a Dodge #80B19 Type B 19-tooth sprocket bored to a 2.00" diameter. The length of chain 140 is a length of #80 single strand roller chain.

Figure 6:
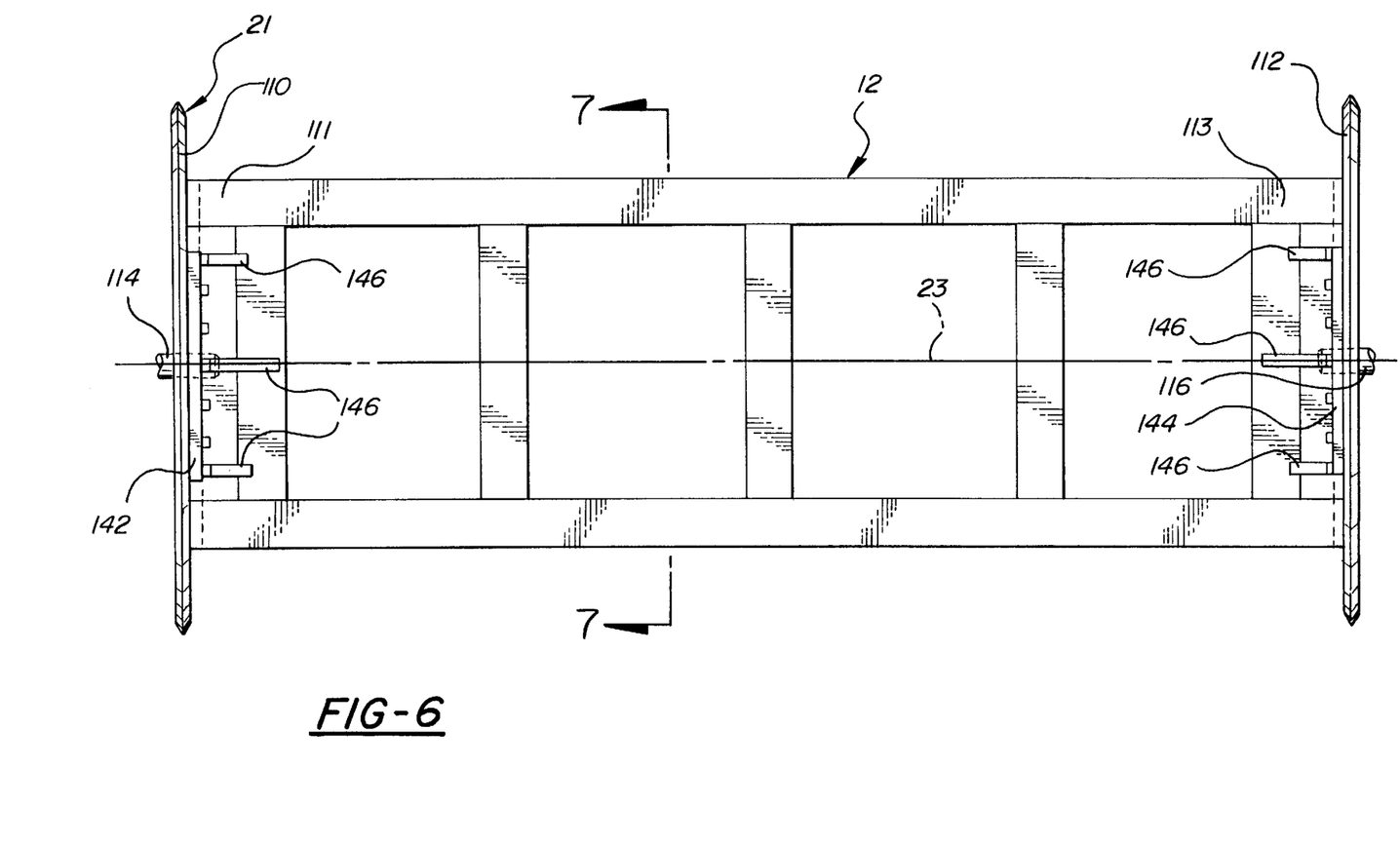
FIG. 6 is a plan view of an upper mold carrier portion of the mold press of FIG. 1.

The first end 111 of the upper mold carrier 12 is rotatably supported on the first upper mold rotator slide plate assembly 30 adjacent the rotation axis 23. The second end 113 of the upper mold carrier 12 is rotatably supported on the second slide plate assembly 34 adjacent the rotation axis 23. Upper mold portions are mounted to a lower surface of the upper mold carrier 12 between the stabilizer plates 110, 112. Mounting feet comprising pieces of angle iron (not shown) attach mold lids to the upper mold carrier frame 12. Other embodiments may employ other suitable means for attaching a mold lid to a frame. As shown in FIGS. 6 and 7, the upper mold carrier 12 comprises a rectangular framework of square steel tubing. First 142 and second 144 mounting brackets are connected to the first 111 and second 113 opposite ends of the upper mold carrier 12, respectively. Each mounting bracket 142, 144 is made of carbon steel plate and extends perpendicularly upward from an upper surface of the upper mold carrier 12 at each end 111, 113 of the upper mold carrier 12. As is best shown in FIGS. 6 and 7, each mounting bracket 142, 144 includes three steel angle-braces or "gussets" 146 spaced along each opposite end of the upper mold carrier 12. The first 142 and second 144 mounting brackets are bolted to the first 110 and second 112 stabilizer plates, respectively.

The lower mold tipper, generally indicated at 148 in FIGS. 1, 7 and 9, comprises two parallel lower mold carrier lift cylinders 150. The lower lift cylinders 150 are disposed parallel to each other and diagonally in relation to the lower mold mounting plate 62. As is best shown in FIG. 9, a lower end of each lower lift cylinder 150 is pivotally connected to one of two lower brackets 152. The lower brackets 152 are each fixed to one of two respective downwardly-extending cylinder attachment braces 154. An opposite upper end of each lift cylinder 150 is pivotally connected to one of two adjacent upper brackets 156 attached to the approximate center of the lower mold mounting plate 62. Each of the lower mold lift cylinders 150 is a Parker Series 2H hydraulic cylinder with a 2 inch bore and a 5½ inch stroke.

An electronic multi-axis motion controller is operatively connected to the upper mold tipper 19, the lower mold tipper 146, the upper mold rotator 21 and the upper mold lift cylinders 26, 28. The motion controller ergonomically positions the upper mold to meet different operators' needs and to enable the mold press assembly 10 to accommodate a variety of mold/retainer configurations.

In place of structures described above, other embodiments of the present invention may include any one of a number of different structures for attaching the upper mold lift cylinders 26, 28 to the slide plate assemblies 30, 34. Other embodiments may also include other types of lift mechanisms, cylinders with different bores and strokes, or entirely different structures capable of supporting the upper mold carrier 12 for reciprocal, rotational and tipping motions. Other embodiments may also include alternative structures for guiding and supporting the linear reciprocal motion of the slide plate assemblies 30, 34 as well as other suitable motor, gear, sprocket and chain combinations. Other embodiments may also use other suitable tipper mechanisms and may include idler guides 118, 120 attached at other points on the slide plate assemblies 30, 34. In addition, entirely different structures may be used to stabilize the upper mold carrier 12 in place of the stabilizer plate arrangement of the present embodiment. Further, the rotator plate 126, stabilizer plates 110, 112 and other components may be made from other suitable materials besides carbon steel plate. They may also use other suitable rotating mechanisms for rotating the upper mold carrier 12 and may include upper mold carriers of suitable constructions other than the square steel tubing framework described above.

In practice, to prepare the mold press assembly 10 to make a part or a number of identical parts, upper and lower mold portions are attached to the upper 12 and lower 16 mold carriers, respectively. The motion controller is then programmed to operate the upper mold tipper 19, the lower mold tipper 146 and the upper mold rotator 21 and the upper mold lift cylinders 26, 28 through an automatic two-part mold press cycle.

In the first part of the two-part cycle, the upper mold carrier 12 moves the upper mold portion away from an operator-access position and the lower mold carrier 16 moves the lower mold portion into an operator-access position. In the second part of the cycle, foam is poured into the lower mold portion, the upper 12 and lower 16 mold carriers and mold portions are moved into a press position, and the upper mold carrier 12 and mold portion are returned to the operator-access position. All motions and dwell positions that the mold carriers 12, 16 move through during the two-part cycle may be adjusted by re-programming the motion controller.

To make a part, an operator loads the upper mold by inserting a retainer portion of the part to be manufactured, into the upper mold cavity. Retainer loading takes place with the upper mold carrier 12 and mold portion positioned at the end point of the second part of the two-part automatic cycle, i.e., the upper mold portion is tipped forward, lifted upward along the mold frame 14 toward the operator's approximate chest-level, and rotated into a position to facilitate cleaning and loading. This position is shown, in phantom, as position A in FIG. 2.

After loading the upper mold portion, the operator actuates the multi-axis motion controller to initiate the first part of the two-part automatic mold cycle. The controller begins the first part of the cycle by tipping the upper mold carrier 12 and mold portion back away from the operator to a position shown, in phantom, as position B in FIG. 2. The controller then actuates the lower mold carrier lift cylinders 150 and tips the lower mold carrier 16 and mold portion forward approximately thirty degrees toward the operator, as shown, in phantom, in FIG. 9. This completes the first part of the automatic mold cycle. The motion of the upper mold carrier 12 is not limited to a purely vertical lift. The lift angle may be preset to move the upper mold carrier 12 along a non-vertical path to accommodate part demolding.

Once the first part of the cycle is complete, the operator removes any part or parts from the lower mold portion that may have been formed in a previous mold cycle. The operator then loads a shell portion of the part to be manufactured, into the lower mold portion cavity.

After loading the lower mold portion, the operator actuates the motion controller, which responds by initiating the second part of the automatic mold cycle. In the second part of the cycle the controller first rotates the lower mold carrier 16 and mold portion back to the press position, drops the upper mold carrier 12 and mold portion down and rotates the upper mold carrier 12 and mold portion into an optimum angular position in preparation for mold closing while tipping the upper mold carrier 12 and mold portion either forward toward position A or aft toward position B—whichever position is farther away from the position from which a foam head will introduce foam into the lower mold portion. The foam head then pours the foam into the shell in the lower mold portion.

Once the pour is complete, the upper mold carrier 12 and mold portion tips to a position over the lower mold portion and the controller causes the upper mold lift cylinders 26, 28 to pull the upper mold carrier 12 and mold portion down into the press position over the lower mold portion thus closing the mold. The "press" position is shown as position C in FIG. 2. The upper mold cylinders 26, 28 maintain downward pressure on the closed mold for a predetermined time. Once the predetermined time has elapsed, the controller automatically opens the mold by lifting the upper mold carrier 12 and mold portion. The controller then tips the upper mold carrier 12 and mold portion forward toward position A and rotates the upper mold carrier 12 and mold portion back into a position where the operator can more easily clean the upper mold portion, i.e., the operator-access position. The operator then removes from the upper mold portion all debris and residue left behind in the molding process and prepares to re-initiate the first part of the cycle.

I intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims.

I claim:

1. A mold press apparatus including an upper mold carrier supported on a mold press frame above a lower mold carrier supported on a mold press base, said frame pivotally supported on an upper mold pivot, said upper mold pivot having a generally horizontal upper mold pivot axis, said upper mold pivot vertically displaced from said upper mold carrier, said upper mold carrier also supported for reciprocal movement toward and away from said upper mold pivot, in which the improvement comprises:

an upper mold tipper including said upper mold pivot and operatively connected to said mold press frame to tip said frame and upper mold carrier about said upper mold pivot axis, said upper mold pivot disposed below said upper mold carrier adjacent said base; and an upper mold rotator connected between said mold press frame and said upper mold carrier and rotatably supporting said upper mold carrier about a rotation axis generally parallel to said upper mold pivot axis, said upper mold carrier being reciprocated, tipped and rotated to enable the mold press to accommodate a variety of mold/retainer configurations and to move the upper mold carrier and an attached upper mold portion into ergonomically suitable positions that meet individual mold press operators' needs.

2. A mold press apparatus as defined in claim 1 in which said mold press frame includes first and second parallel lift tubes and in which said upper mold rotator comprises first and second slide plate assemblies mounted for reciprocal movement along said respective first and second parallel lift tubes, said upper mold carrier having a first end rotatably supported on said first slide plate assembly adjacent said rotation axis and a second end rotatably supported on said second slide plate assembly adjacent said rotation axis.

3. A mold press apparatus as defined in claim 2 in which said mold press frame includes an elongated rail fixed to each said lift tube, each said slide plate assembly being movably mounted to one of said elongated rails.

4. A mold press apparatus as defined in claim 2 in which said mold press frame includes first and second upper mold lift cylinders each housed within said respective first and second lift tubes, each said upper mold lift cylinder having a lower end fixed within said respective lift tube and an upper end supported for reciprocal movement within said respective lift tube, said first upper mold lift cylinder upper end supporting said first slide plate assembly and said second upper mold lift cylinder upper end supporting said second slide plate assembly.

5. A mold press apparatus as defined in claim 4 further including a multi-axis motion controller connected to said upper mold tipper, said upper mold rotator and said upper mold lift cylinders.

6. A mold press apparatus as defined in claim 2 in which said upper mold rotator includes first and second stabilizer plates rotatably supported on said respective first and second slide plate assemblies to rotate about said rotation axis, said upper mold rotator also including first and second idler guides rotatably supported on said respective first and second slide plate assemblies and spaced from said rotation axis, said stabilizer plates having outer circumferential rims in guided turning engagement with said respective idler guides.

7. A mold press apparatus as defined in claim 6 in which said upper mold rotator includes a rotator motor operatively connected between one of said slide plate assemblies and said upper mold carrier.

8. A mold press apparatus as defined in claim 7 in which said upper mold rotator includes a rotator plate rotatably and coaxially mounted with and fixed in relation to one of said stabilizer plates for rotation about said rotation axis, said rotator plate having an outer circumferential rim; and in which said rotator motor is a hydraulic motor supported on said first slide plate assembly, said hydraulic motor in driving engagement with said outer circumferential rim of said rotator plate.

9. A mold press apparatus as defined in claim 8 in which said rotator plate is a chain plate having a chain fixed along said outer circumferential rim of said rotator plate; and in which said rotator motor is operatively connected to a drive shaft, said drive shaft is fixed to a chain sprocket, and said chain sprocket is in driving engagement with said chain fixed to said outer circumferential rim of said rotator plate.

10. A mold press apparatus as defined in claim 1 in which said upper mold tipper is movably supported on said mold press base for lateral positional adjustment relative to said mold press base in a direction perpendicular to said upper mold pivot axis.

11. A mold press apparatus as defined in claim 1 in which said mold press base includes floor attachments.

12. A mold press apparatus as defined in claim 2 in which said mold press base includes first and second tipper supports disposed at respective first and second opposite ends of said mold press base, said upper mold tipper comprising first and second frame supports movably supported on said respective first and second tipper supports for horizontal position adjustment relative to said mold press base, said first and second frame supports pivotally connected to said respective first and second tipper supports adjacent said upper mold pivot axis.

13. A mold press apparatus as defined in claim 12 in which said upper mold tipper includes at least one tipper motor operatively connected between said mold press frame and one of said frame supports.

14. A mold press apparatus as defined in claim 13 in which at least one of said frame supports includes a tipper plate having an upper semi-circular rim, and in which said tipper motor is a hydraulic motor supported on said first lift tube, said tipper motor in driving engagement with said upper semi-circular rim of said tipper plate.

15. A mold press apparatus as defined in claim 14 in which said tipper plate is a chain plate having a chain fixed along said upper semi-circular rim of said tipper plate; and in which said tipper motor is operatively connected to a drive shaft, said drive shaft is fixed to a chain sprocket, and said chain sprocket is in driving engagement with said upper chained rim of said tipper plate.

16. A mold press apparatus as defined in claim 1 in which said lower mold carrier is pivotally mounted to said mold press base about a lower mold pivot axis generally parallel to said upper mold pivot axis.

17. A mold press apparatus as defined in claim 16 further including a lower mold tipper supported on said mold press base, said lower mold tipper comprising a lower mold carrier lift cylinder having a first end fixed to said mold press base and a second end connected to said lower mold carrier.

* * * * *